April 6, 1948.  O. T. BLOOM  2,439,334
SURFACE CLEANING MACHINE
Filed Sept. 23, 1942
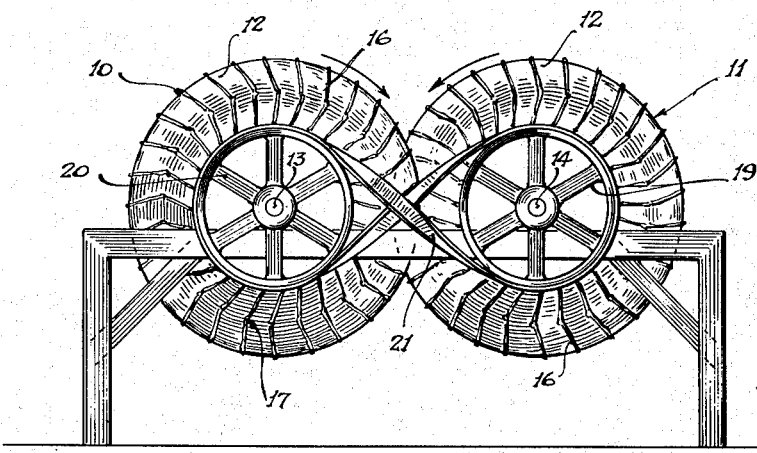
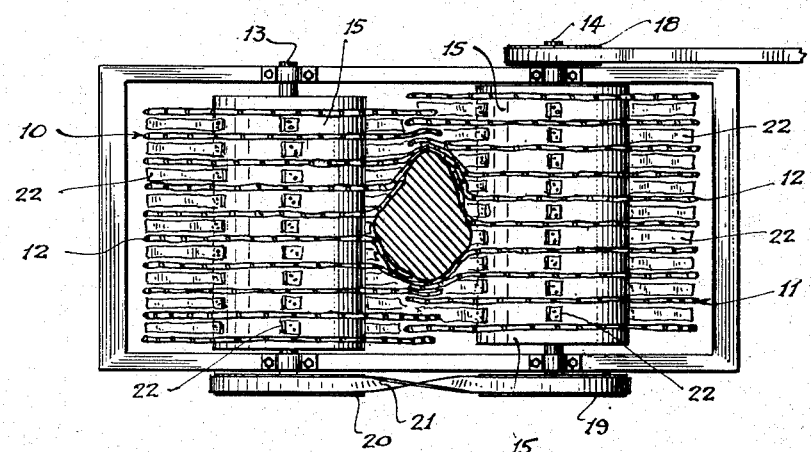
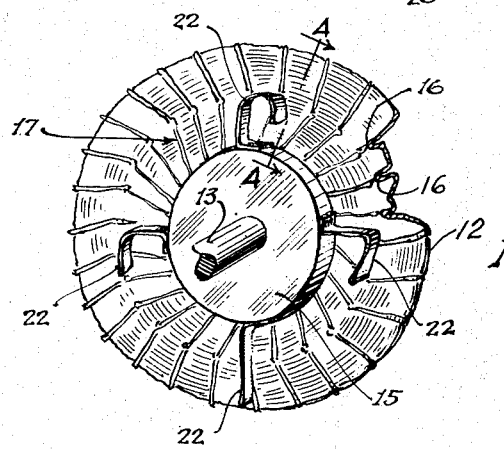
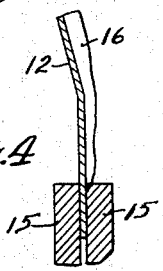
Oscar T. Bloom
INVENTOR
BY R. G. Story
ATTORNEY
ATTEST- Patented Apr. 6, 1948

2,439,334

UNITED STATES PATENT OFFICE 2,439,334

SURFACE CLEANING MACHINE

Oscar T. Bloom, Chicago, Ill., assignor to Industrial Patents Corporation, Chicago, Ill., a corporation of Delaware Application September 23, 1942, Serial No. 459,450

7 Claims. (Cl. 17—11.1)

This invention relates to a machine for abrading the surface of an article and more particularly to an abrading machine for defeathering poultry, the machine having deformable means for engaging the entire surface of the irregularly shaped carcass of the bird.

It is an object of this invention to provide a machine having driven means for whipping against the surface of an article to pull removable materials away from the surface.

It is another object of this invention to provide a machine having driven deformable means for whipping the entire surface of an irregularly shaped article to pull removable material away from its surface.

Other objects of this invention will appear more fully below.

Figure 1 is a front elevation of the machine;

Figure 2 is a plan view of the machine showing an article disposed between the beating means of the machine;

Figure 3 is a perspective view of one of the elements forming the beating means, including the abrading disks and whipping flaps interposed between each pair of disks; and Figure 4 is a partial sectional view of the disc structure taken on line 4—4 of Figure 3.

The present machine has been developed for the particular purpose of removing feathers from poultry but as the description proceeds it will be seen that the machine might well be applied to the cleaning of any type of an article wherein a loosely adhering material is found on the surface of an article.

The device here shown is especially useful for cleaning an object having an irregular shape and provides driven means having a deformable surface to engage substantially the entire periphery of the object. The deformable whipping means is selected from that class of flexible materials having a surface with a high coefficient of friction and, therefore, when the whipping means comes in contact with a material not too firmly attached to the surface of the article, the relative motion between the driven whipping means and the article will cause the material to be rubbed off of the surface.

As shown in Figure 2, in its preferred form, the machine embodies two generally cylindrical whipping members 10 and 11 disposed opposite to each other and each of the cylindrical members is made up of a plurality of spaced disks 12 mounted on the axles 13 and 14. Each of the disks 12 is held spaced from the adjoining disk by spacers 15 carried on the axles 13 and 14.

The disks 12 may be made of any one of a number of materials, but it is important to this invention that the disk shall be made of a deformable material and preferably a heavy canvas duck is provided. The surface of the canvas disk may be impregnated with self-vulcanizing latex or any other tacky material to improve the surface of the disk whereby it will have a relatively high coefficient of friction. As shown in Figure 3, the disk may be provided with a plurality of ridges 16 which may be formed by pinching the duck together and sewing a ridge into the material. Each of the ridges 16 extends inwardly a fixed distance to cause the disk to be cupped as shown in Figure 3 and the base of the cup is denoted as 17.

Each of the axles 13 and 14 is rotatably mounted on the frame of the machine, and the axle 14, for instance, may be driven by any suitable means such as a pulley 18. At its opposite end, the axle 14 is provided with a pulley 19 for driving pulley 20 connected to the axle 13, through belt 21. The driving interconnection of the two cylindrical members 10 and 11 is such that they are driven in opposite directions as shown by the arrows in Figure 1.

When a machine, constructed as above described, is provided, an article such as a fowl may be placed in position between the two rotating cylindrical members (see Figure 2) and the disks 12, which are normally perpendicularly disposed with respect to the axles 13 and 14, are pushed aside and due to the cupping shape given the disks they will deform in substantially the manner indicated in Figure 2 so that a portion of each of the disks will be turned to engage the surface between each pair of the disks. In this manner the entire surface of the irregularly shaped object is engaged by the flexible whipping means which has a surface with a relatively high coefficient of friction and, feathers, including the pin feathers, which are removably but firmly attached to the carcass are easily pulled off and the bird is stripped of its feathers.

The fact that the friction disks are deformable insures that the entire surface of the fowl will be covered and a complete defeathering of the bird may be accomplished in a very short period of time.

It is conceivable that a single cylindrical member could be used, the bird being held into the rotating means in much the same manner as a tool is held to a grindstone. This would necessitate the presentation of the bird to the machine a plurality of times to complete the defeathering operation on both sides and in the preferred construction, the two cylindrical members 10 and 11 are provided in order to complete the defeathering of the carcass more rapidly.

It is not essential that the disk members 12 be cupped as shown, but as here shown, the cupping of the disks gives direction to the deformation of the disks as the bird is presented between the cylindrical members 10 and 11. This will insure that all of the surface of the irregularly shaped object is covered by the whipping or rubbing means.

In addition to the surface rubbing action, the beads 16 on disks 12 tend to provide additional frictional surfaces which have a much greater frictional contact with loose material on the surface of the article. In removing feathers, the beads 16 also serve to reach the pin feathers that would be hard to reach with the relatively flat surface of a smooth disk.

In addition to the disks 12, abrading flaps 22 may be provided. A plurality of flaps 22 are preferably placed between each pair of the disks and the flaps may be made of the same material as the disks. As shown in Figure 3, the flaps may be mounted upon spacers 15. The flaps are thrown outwardly by centrifugal force, as are the disks, and beat against the surface of the object wherever the disks themselves may be turned in opposite directions as the fowl passes between the cylindrical members. This action is best seen in Figure 2, while the association of the flaps and disks is shown in Figure 3.

As above stated, other objects than fowl may be subjected to the operation of this machine. It will be appreciated that the frictional rubbing action here described might be utilized to remove any material from the surface of an irregular shaped object which material can be stripped from the object by means of a firm and relatively hard rubbing action.

While the above is the preferred construction of this machine it is conceivable that those skilled in the art might develop modifications. It is contemplated that all such modifications shall be within the scope of the following claims.

I claim:

1. A device for pulling material removably attached to an irregularly shaped article from the surface thereof comprising a driven cylindrical means including a plurality of spaced disks for engaging the surface; said disks being deformable; each of said disks having a surface characteristic of a relatively high coefficient of friction and being provided with abrading ridges; said disks having a relatively large, flat, surface area of which a portion is adapted to be maintained continuously in contact with the surface being cleaned; and means to drive said disks whereby when an article is pressed into the engaging means and held stationary with respect to the disks, the driven disks will be deformed to frictionally engage the surface of the article to abrade the surface and pull the removable material from the surface of the article.

2. A device for pulling material removably attached to an irregularly shaped article from the surface thereof comprising a pair of cooperating, driven, cylindrical means for engaging the surface; each of said means including a plurality of spaced disks; each of said disks being deformable; each of said disks having a surface characteristic of a relatively high coefficient of friction and being provided with abrading ridges; said disks having a relatively large, flat, surface area of which a portion is adapted to be maintained continuously in contact with the surface being cleaned; said pair of cooperating cylindrical means being disposed oppositely to and spaced from each other and being constructed and arranged to receive the article to be cleaned therebetween so that said portions of each of said disks may simultaneously contact the entire periphery of the article to be cleaned, and means to drive said engaging means whereby when an article is pressed into the driven disks and held stationary with respect to the disks, the disks will be deformed to frictionally engage the surface of the article to abrade the surface and pull the removable material from the surface of the article.

3. A device for pulling material removably attached to an irregularly shaped article from the surface thereof comprising a driven cylindrical means including a plurality of spaced disks for engaging the surface; said disks being deformable; each of said disks being flared from a base portion to have a shallow cup shape; each of said disks having a surface characteristic of a relatively high coefficient of friction; and means to drive said disks whereby when an article is pressed into the driven disks and held stationary with respect to the disks, the disks will bend about the base portion and will be thus deformed to frictionally engage the surface of the article to pull the removable material from the surface of the article.

4. A device for pulling material removably attached to an irregularly shaped article from the surface thereof comprising a pair of cooperating, driven, cylindrical means for engaging the surface; each of said means including a plurality of spaced disks; said disks being deformable; each of said disks being flared from a base portion to have a shallow cup shape; each of said disks having a surface characteristic of a relatively high coefficient of friction; and means to drive said engaging means whereby when an article is pressed into the disks and held stationary with respect to the driven disks, the disks will bend about the base portion and will thus be deformed to frictionally engage the surface of the article to pull the removable material from the surface of the article.

5. A device for pulling material removably attached to an irregularly shaped article from the surface thereof comprising a driven cylindrical means including a plurality of spaced disks for engaging the surface; a plurality of flaps disposed between each pair of said spaced disks for engaging the surface; said disks and said flaps being deformable; each of said disks and flaps having a surface characteristic of a relatively high coefficient of friction; and means to drive said disks and flaps whereby when an article is pressed into engagement and held stationary with respect to the driven disks and flaps, the disks and flaps will be deformed to frictionally engage the surface of the article to pull the removable material from the surface of the article.

6. A device for pulling material removably attached to an irregularly shaped article from the surface thereof comprising a pair of cooperating, driven, cylindrical means for engaging the surface; each of said means including a plurality of spaced disks; a plurality of flaps disposed between each pair of said spaced disks; said disks and said flaps being deformable; each of said disks and flaps being surfaced with a coating of gummy latex to provide a relatively high coefficient of friction; and means to drive said engaging means whereby when an article is pressed into the disks and flaps and held stationary with respect to said disks and flaps, the disks and flaps will be deformed to frictionally engage the surface of the article to pull the removable material from the surface of the article.

7. A device for pulling material removably attached to an irregularly shaped article from the surface thereof comprising a driven cylindrical means including a plurality of spaced disks for engaging the surface; a plurality of flaps disposed between each pair of said spaced disks; said disks and flaps being deformable; each of said disks being flared from a base portion to have a shallow cup shape; said flaps extending outwardly past said bead; each of said disks and flaps having a surface characteristic of a relatively high coefficient of friction; and means to drive said disks and flaps whereby when an article is pressed into the driven disks and flaps and held stationary with respect to the disks and flaps, the disks will bend about the base portion and will be thus deformed to frictionally engage the surface of the article while the flaps cooperate therewith to pull the removable material from the surface of the article.

OSCAR T. BLOOM.

REFERENCES CITED

The following references are of record in the file of this patent:

UNITED STATES PATENTS

| Number | Name | Date |
| --- | --- | --- |
| 1,372,393 | Bouda | Mar. 22, 1921 |
| 1,502,535 | Young | July 22, 1924 |
| 1,706,577 | Larsen | Mar. 26, 1929 |
| 1,875,980 | Bingham | Sept. 6, 1932 |
| 2,235,619 | McMahan et al. | Mar. 18, 1941 |
| 2,350,656 | Williamson | June 6, 1944 |